(12) United States Patent
Lamping et al.

(10) Patent No.: US 8,595,066 B1
(45) Date of Patent: Nov. 26, 2013

(54) COST DISCOUNTING TO PROVIDE DOMINANT PARTICIPATION STRATEGY ARBITRATION FOR ONLINE ADVERTISING AND ARBITRATIONS SUPPORTING OFFERS FROM DIFFERENT COST DISCOUNTING METHODOLOGIES

(75) Inventors: John Lamping, Los Altos, CA (US); Robert Shillingsburg, San Jose, CA (US); Eric Veach, Mountain View, CA (US)

(73) Assignee: Google Inc., Mountain View, CA (US)

( * ) Notice: Subject to any disclaimer, the term of this patent is extended or adjusted under 35 U.S.C. 154(b) by 2747 days.

(21) Appl. No.: 10/877,790

(22) Filed: Jun. 25, 2004

Related U.S. Application Data

(60) Provisional application No. 60/482,280, filed on Jun. 25, 2003.

(51) Int. Cl.
*G06Q 30/00* (2012.01)
*G05B 19/418* (2006.01)

(52) U.S. Cl.
USPC ...................................... 705/14.41; 705/27.1

(58) Field of Classification Search
USPC ....................................................... 705/14, 27
See application file for complete search history.

(56) References Cited

U.S. PATENT DOCUMENTS

| 6,012,053 | A  | * | 1/2000 | Pant et al. ............................. | 1/1 |
| 2002/0169760 | A1 | * | 11/2002 | Cheung et al. .................... | 707/3 |
| 2003/0014331 | A1 | * | 1/2003 | Simons ........................... | 705/27 |
| 2004/0015836 | A1 | * | 1/2004 | Layes .......................... | 717/106 |

OTHER PUBLICATIONS

The future of advertising: The harder hard sell. The Economist. Jun. 24, 2004.*

* cited by examiner

*Primary Examiner* — Victoria Vanderhorst
(74) *Attorney, Agent, or Firm* — Lerner, David, Littenberg, Krumholz & Mentlik, LLP

(57) ABSTRACT

Maximum offers in an online advertising space (and/or some enhanced ad rendering attribute) arbitration may be discounted such that there exists a dominant bidding strategy, whereby advertisers can choose optimal maximum offers without knowing anything about their competitors' behavior, and without knowing anything about the relative selection rates for different ad spot positions (or the relative values of different enhanced ad rendering attributes that advertisers may compete for). Arbitrations can be run combining offers for use in arbitrations with a first price discounting method, with offers for use in arbitrations with a second price discounting technique.

58 Claims, 8 Drawing Sheets

COST DISCOUNTING TO PROVIDE DOMINANT PARTICIPATION STRATEGY ARBITRATION FOR ONLINE ADVERTISING AND ARBITRATIONS SUPPORTING OFFERS FROM DIFFERENT COST DISCOUNTING METHODOLOGIES

§0. RELATED APPLICATIONS

This application claims benefit to U.S. Provisional Application Ser. No. 60/482,280, titled "DOMINANT STRATEGY AUCTION FOR ONLINE ADVERTISING," filed on Jun. 25, 2003, and listing John Lamping, Robert Shillingsburg and Eric Veach as inventors (referred to as "the '280 provisional"). That application is incorporated herein by reference. The scope of the present invention is not limited to any requirements of the specific embodiments described in that application.

§1. BACKGROUND OF THE INVENTION

§1.1 Field of the Invention

The present invention concerns arbitrating and/or advertising. In particular, the present invention concerns on-line advertising where advertisers compete for one or more desired ad rendering attributes (e.g., position, size, volume, time period, ad type, etc.).

§1.2 Background Information

Existing online advertising arbitrations known in the art allow advertisers to compete for preferred advertising spots on a document. For example, in one online advertising pricing model known in the art, the ad system charges each advertiser based on its next lower competitor's maximum offer. For example, in an arbitration involving N advertisers, the "top" advertiser in Position 1 may be charged an amount per user click equal to, or otherwise determined using, the maximum offer proffered by the next ranked advertiser in Position 2. Similarly, an advertiser in Position i may be charged an amount based on the maximum offer of the advertiser in Position i+1, and the last advertiser in Position N may be charged based on a reserve price. For example, the AdWords and AdSense advertising services from Google or Mountain View, Calif. provide price discounting under which a price for an ad is determined using information from a next lower ad. U.S. patent application Ser. Nos. 10/340,543, filed Jan. 10, 2003, titled: "AUTOMATED PRICE MAINTENANCE FOR USE WITH A SYSTEM IN WHICH ADVERTISEMENTS ARE RENDERED WITH RELATIVE PREFERENCES" and listing Eric Veach and Salar Arta Kamangar as inventors ("the '543 application"); and 10/340,542, filed Jan. 10, 2003, titled "AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION" and listing Eric Veach and Salar Arta Kamangar as inventors ("the '542 application") describe some embodiments that provide such price discounting. Both of these applications are incorporated herein by reference.

A dominant bidding strategy provides a participant in an arbitration (such as an auction) a way to maximize their benefit from the arbitration without regard to the behavior of the other participants. Existing arbitration models, such as those introduced above, have a dominant bidding strategy when there is only one advertising position up for arbitration. However, in the common case where multiple advertising positions are up for arbitration, no dominant bidding strategy exists. A manifestation of this deficiency is that the marginal cost paid per click may exceed, sometimes by a great degree, the maximum offer set by the advertiser for the price per click. This is because these models ensure only that the average price per click is less than the maximum offer price. The following example illustrates how marginal costs per click may greatly exceed a maximum cost per click offer under one arbitration model.

In this example, assume that ads are placed based solely on a maximum offer, and that an advertiser pays the maximum offer from the advertiser of the next lower ad. Finally, assume that positions of ad spots have monotonically decreasing selection rates of 1.00% for ad spot position 1, 0.70% for ad spot position 2, 0.65% for ad spot position 3, and 0.30% for ad spot position 4. Assume further that in a first scenario, advertiser A offers a maximum of $0.90 per selection, advertiser B offers a maximum of $0.80 per selection, advertiser C offers a maximum of $0.40 per selection, and advertiser D offers a maximum of $0.35 per selection. Under this first scenario, advertiser C would pay $22.75 for 65 selections over 10000 impressions (i.e., $0.35*0.0065*10000). Assume that advertiser C would like to move up to the second position to increase the number of selections of its ad. To do so, assume that under a second scenario, advertiser C makes a maximum offer of $0.81. Under this second scenario, advertiser C would pay $56.00 for 70 selections over 10000 impressions (i.e., $0.80*0.0070*10000). Notice that advertiser C would pay an extra $33.25 (=$56.00−$22.75) for 5 (=70−65) extra impressions. Thus, the marginal cost for the five additional impressions would be $6.65 per selection (=$33.25/5). This marginal cost greatly exceeds its average cost per selection of $0.80.

As the foregoing example illustrates, even with price discounting features, advertisers should be very careful with their maximum offers under some current online ad arbitration systems. Assuming that information such as ad position selection rates and competitor maximum offers are made available to advertisers, to choose an optimal maximum offer, an advertiser still must continually monitor this information and change its maximum offer as this information changes. This is because the optimal maximum offer for an advertiser is a function of the behavior of its competitors and the selection rates of the different positions of ad spots on a Webpage.

Moreover, even for a sophisticated, careful advertiser, some current implementations of online advertising arbitrations that are based on the "position arbitration" model (such as the Google AdWords service), or some other competition for one or more desired ad rendering attributes, might not provide enough information for advertisers to make well-informed choices of maximum offers. To set an optimal maximum offer under existing models, advertisers need to know the relative selection (e.g., clickthrough) rates for different ad positions, and the maximum offers chosen by other competing advertisers.

Another deficiency found in some known pricing models is price instability. Since the price paid by each advertiser is determined by a single competitor, one advertiser can cause great fluctuations in the prices paid by its competitors.

In view of the foregoing, better arbitration and cost discounting models for online advertising would be useful. It would be useful if a marginal cost paid per click could not exceed a maximum offer set by the advertiser for the price per click.

§2. SUMMARY OF THE INVENTION

The present invention provides new methods and apparatus for discounting maximum offers in an online advertising space (and/or some enhanced ad rendering attribute) arbitration such that there exists a dominant bidding strategy, whereby advertisers can choose optimal maximum offers without knowing anything about their competitors' behavior, and without knowing anything about the relative selection rates for different ad spot positions (or the relative values of different enhanced ad rendering attributes that advertisers may compete for).

In one embodiment consistent with the present invention, the dominant bidding strategy for an advertiser is to set its maximum offer at its marginal value per selection (that is; its gross profit per selection). This optimal maximum offer depends only on parameters of the advertiser's business, and does not fluctuate with maximum offers of competitors or selection rates of various ad spot positions.

The present invention also provides new methods and apparatus for running arbitrations combining offers for use in arbitrations with a first price discounting method, such as those described in the '542 and '543 applications for example, with offers for use in arbitrations with a second price discounting technique consistent with the present invention.

§3. BRIEF DESCRIPTION OF THE DRAWINGS

§4. DETAILED DESCRIPTION

Figure 1:
FIG. 1 is a high-level diagram showing parties or entities that can interact with an advertising system.

The present invention may involve novel methods, apparatus, message formats, and/or data structures for providing improved cost discounting in arbitrations, such as arbitrations for assigning desired ad rendering attributes. The present invention may also involve novel methods, apparatus, message formats, and/or data structures allowing offers made assuming different cost discounting techniques, to be considered together, in a common arbitration. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language may be used. Thus, the present invention is not intended to be limited to the embodiments shown and the inventors regard their invention as any patentable subject matter described.

In the following, definitions of terms that may be used in this description are provided in §4.1. Then, environments in which, or with which, the present invention may operate are described in §4.2. Thereafter, exemplary embodiments consistent with the present invention, as well as examples illustrating the embodiments, are described in §4.3. Finally, some conclusions regarding the present invention are set forth in §4.4.

§4.1 DEFINITIONS

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad. The selection rate of an ad rendered in an ad spot may be composed of two components: a creative-specific selection rate (CSR), and a position-specific selection rate (PSR). In at least some embodiments consistent with the present invention, the CSR and/or the PSR may have been normalized to remove the influence of external factors that may affect selection rate. Each ad creative has its own CSR and each ad slot position has its own PSR. An estimated selection rate for a given ad creative in a particular ad slot position may be defined as the product of the ad creative's CSR and the ad slot position's PSR.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions or selections of the ad (i.e., the number of times an ad is rendered or selected) is referred to as the "conversion rate." If a conversion is defined to be able to occur within a predetermined time since the serving of an ad, one possible definition of the conversion rate might only consider ads that have been served more than the predetermined time in the past.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio or video file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

"Ad area" may be used to describe an area (e.g., spatial and/or temporal) of a document reserved or made available to accommodate the rendering of ads. For example, Web pages often allocate a number of spots where ads can be rendered, referred to as "ad spots". As another example, an audio program may allocate "ad time slots".

An "offer" is something presented for acceptance. In the context of the present invention, an offer will often be a monetary amount, associated with an advertisement, to be paid, upon the occurrence of an act with respect to the advertisement (e.g., impression, selection, conversion, etc.) An offer may be a bid. In some embodiments, rather than defining a precise value to be paid, an offer may specify a maximum and/or a minimum amount to be paid. An offer may be non-monetary.

An "arbitration" is a process for determining one or more winning participants competing for something. An auction is an example of an arbitration.

§4.2 ENVIRONMENTS IN WHICH, OR WITH WHICH, THE PRESENT INVENTION MAY OPERATE

§4.2.1 Exemplary Advertising Environment

FIG. 1 is a high level diagram of an advertising environment. The environment may include an ad entry, maintenance and delivery system (simply referred to as an "ad server" or "ad system") 120. Advertisers 110 may directly, or indirectly, enter, maintain, and track ad information in the system 120. The ads may be in the form of graphical ads such as so-called banner ads, text only ads, image ads, audio ads, animation ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or a selection related to the ad occurred) to the system 120. This usage information may include measured or observed user behavior related to ads that have been served.

Figure 2:
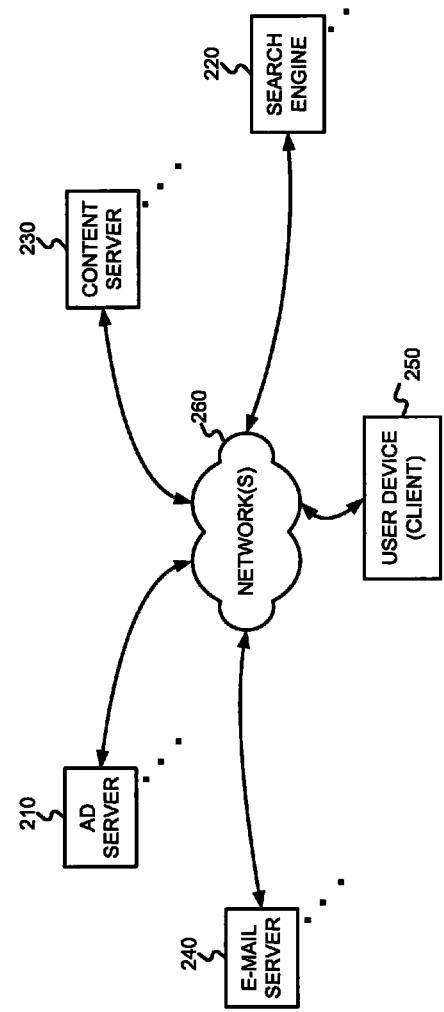
FIG. 2 is a diagram illustrating an environment in which, or with which, embodiments consistent with the present invention may operate.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, etc.), some other content rendering facility, an e-mail facility (e.g., Outlook from Microsoft), etc. A search engine 220 may permit user devices 250 to search collections of documents (e.g., Web pages). A content server 210 may permit user devices 250 to access documents. An e-mail server (such as Gmail from Google, Hotmail from Microsoft Network, Yahoo Mail, etc.) 240 may be used to provide e-mail functionality to user devices 250. An ad server 210 may be used to serve ads to user devices 250. For example, the ads may be served in association with search results provided by the search engine 220. Alternatively, or in addition, content-relevant ads may be served in association with content provided by the content server 230, and/or e-mail supported by the e-mail server 240 and/or user device e-mail facilities.

As discussed in U.S. patent application Ser. No. 10/375, 900 (incorporated herein by reference), titled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Hark, Deepak Jindal and Narayanan Shivakumar as inventors ("the '900 application), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., a Web page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, selection or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

The search engine 220 may transmit information about the ad and when, where, and/or how the ad was to be rendered (e.g., position, click-through or not, impression time, impression date, size, conversion or not, etc.) back to the ad server 120/210. As described below, such information may include information for determining on what basis the ad was determined relevant (e.g., strict or relaxed match, or exact, phrase, or broad match, etc.) Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.2.2 Exemplary Ad Entry, Maintenance and Delivery Environment

Figure 3:
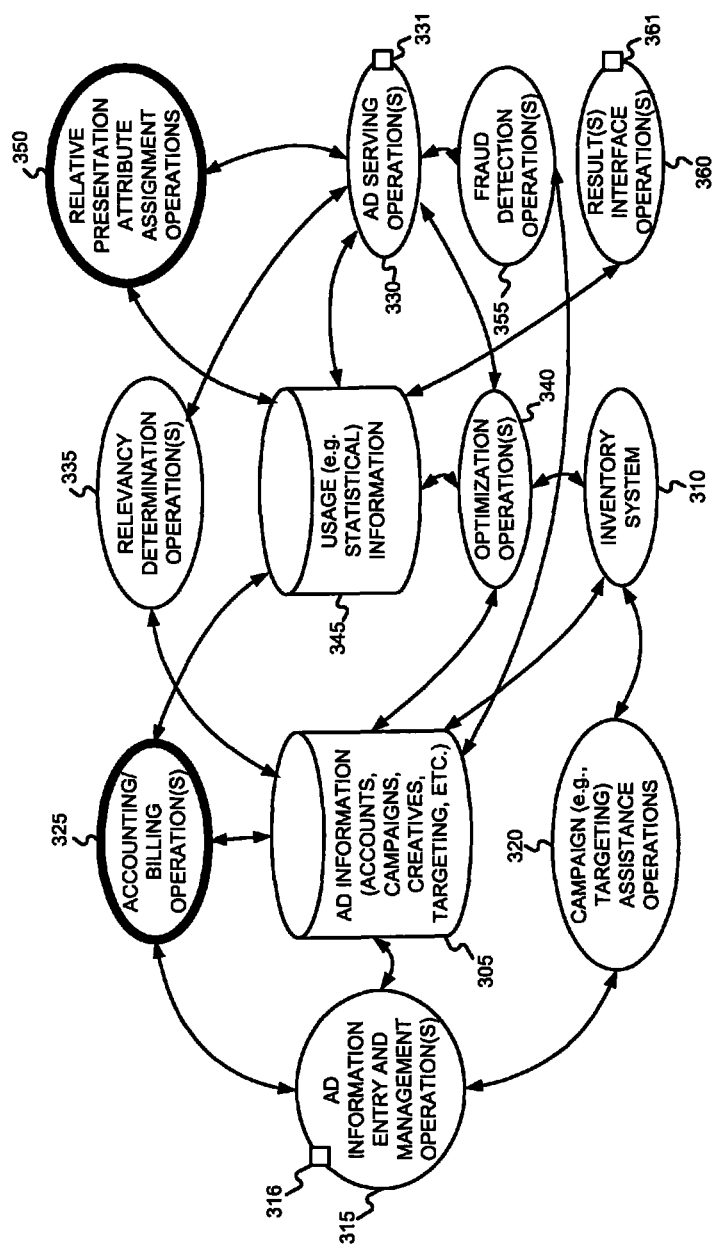
FIG. 3 is a bubble diagram of operations and information of an exemplary ad entry, maintenance and delivery system with which the present invention may operate.

FIG. 3 illustrates an exemplary ad system 300 in which, or with which, the present invention may be used. The exemplary ad system 300 may include an inventory system 310 and may store ad information 305 and usage information 345. The exemplary system 300 may support ad information entry and management operations 315, campaign (e.g., targeting) assistance operations 320, accounting and billing operations 325, ad serving operations 330, relevancy determination operations 335, optimization operations 340, relative presentation attribute assignment (e.g., position ordering) operations 350, fraud detection operations 355, and result interface operations 360.

Advertisers 110 may interface with the system 300 via the ad information entry and management operations 315 as indicated by interface 316. Ad consumers 130 may interface with the system 300 via the ad serving operations 330 as indicated by interface 331. Ad consumers 130 and/or other entities (not shown) may also interface with the system 300 via results interface operations 360 as indicated by interface 361.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost offer (cost per click-though, cost per conversion, etc.). Alternatively, or in addition, each ad group may include an average cost offer (e.g., average cost per click-through, average cost per conversion, etc.). Therefore, a single maximum cost offer and/or a single average cost offer may be associated with one or more keywords. As stated, each ad group may have one or more ads or "creatives" (That is, ad content that is ultimately rendered to an end user.). Naturally, the ad information 305 may include more or less information, and may be organized in a number of different ways.

The ad information 305 can be entered and managed via the ad information entry and management operations 315. Campaign (e.g., targeting) assistance operations 320 can be employed to help advertisers 110 generate effective ad campaigns. For example, the campaign assistance operations 320 can use information provided by the inventory system 310, which, in the context of advertising for use with a search engine, may track all possible ad impressions, ad impressions already reserved, and ad impressions available for given keywords. The ad serving operations 330 may service requests for ads from ad consumers 130. The ad serving operations 330 may use relevancy determination operations 335 to determine candidate ads for a given request. The ad serving operations 330 may then use optimization operations 340 to select a final set of one or more of the candidate ads. Finally, the ad serving operations 330 may use relative presentation attribute (e.g., position) assignment operations 350 to order the presentation of the ads to be returned. The fraud detection operations 355 can be used to reduce fraudulent use of the advertising system (e.g., by advertisers), such as through the use of stolen credit cards. Finally, the results interface operations 360 may be used to accept result information (from the ad consumers 130 or some other entity) about an ad actually served, such as whether or not ad selection occurred, whether or not conversion occurred (e.g., whether the sale of an advertised item or service was initiated or consummated within a predetermined time from the rendering of the ad), etc. Such results information may be accepted at interface 361 and may include information to identify the ad and time the ad was served, as well as the associated result.

As indicated by the heavy lines in FIG. 3, features consistent with the present invention can be used with accounting/billing operations 325 and/or relative presentation attribute assignment operations 350.

§4.3 EXEMPLARY EMBODIMENTS

The present invention may be used to discount offers used in various arbitration techniques so that the marginal cost per user action (e.g., selection) is restricted. In at least some embodiments consistent with the present invention an advertiser's marginal cost per selection never exceeds their maximum offer. Principles of the present invention may be applied to different attribute assignment (e.g., position arbitration) techniques. Exemplary embodiments applying principles of the present invention to a position arbitration that only uses price are described in §4.3.1 below. Then, exemplary embodiments applying principles of the present invention to a position arbitration that uses both price information and performance information (e.g., a product of price per selection and selection rate, referred to as effective cost per impression or "eCPI") are described in §4.3.2 below.

Advertisements may be displayed on a search results Web page, or any other Web page or document. In one embodiment of the present invention, a Webpage display shows n ads, in positions 1 through n. Each ad spot position has an associated selection rate, which may be the average selection rate achieved by all advertisements shown in ad spot position i. In one embodiment consistent with the present invention, the selection rates descend monotonically by ad spot position, that is, selection rate$_i$>selection rate$_j$ for all i, j such that $1<=i<j<=n$. If selection rates do not descend monotonically with ad spot positions, the ad spot positions may be relabeled to achieve monotonic descent of selection rate.

Each of n participants (e.g., advertisers) submits a maximum offer. These maximum offers may be expressed in terms of cost-per-selection (e.g., cost-per-click or "CPC"), or cost for some other event (e.g., impression, some other user behavior such as conversion, etc.).

§4.3.1 Simple Price for Position Ad Scoring Model

The embodiments described in this section may be used with arbitration systems in which positioning is still determined using only a cost per selection offer. The top position goes to the ad with the highest offer, only the second position goes to the ad with the second highest offer, and so on.

§4.3.1.1 New Cost Determination Technique For Use with Price for Position Ad Scoring Model

§4.3.1.1.1 Exemplary Methods

Figure 4:
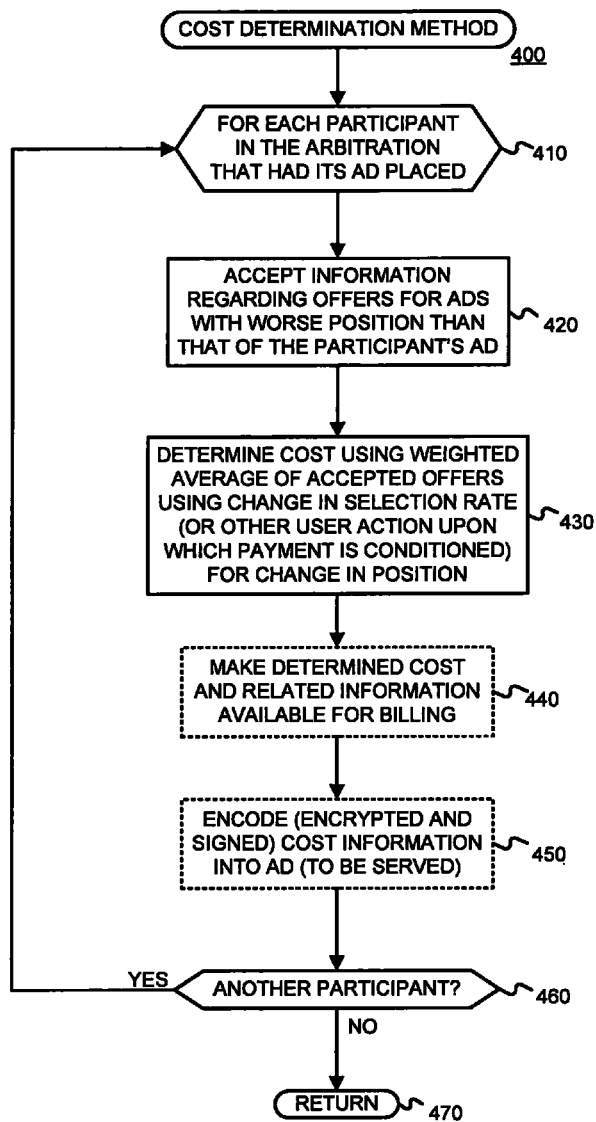
FIG. 4 is a flow diagram of an exemplary method that may be used to discount a cost in a manner consistent with the present invention.

FIG. 4 is a flow diagram of an exemplary method 400 that may be used to determine a cost in a manner consistent with the present invention. As indicated by loop 410-460, a number of acts may be performed for each participant (e.g., each advertiser participating in the arbitration) that had an ad placed. Information regarding offers for ad(s) with worse position(s) than that of the participant's ad is accepted. (Block 420). This information is used in a cost determination. For example, a cost may be determined using a weighted average of the accepted offers. (Block 430) The weighting may be determined using a change in the selection rate (or some other user action upon which payment is conditioned) between the position of the participant's ad and the position(s) of the other ad(s). Note that the positions may have a general selection rate (e.g., over a group of ads, or over all ads). Generally, the selection rate will monotonically decrease as the ad spot position becomes lower.

Once the cost is determined, the determined cost (and related information) should be made available for billing. (Block 440) Alternatively, or in addition, the determined cost can be encoded into the ad information served. (Block 450) This encoded determined cost information may be encrypted and/or signed for security purposes. When the participants have been processed, the method 400 may be left. (Node 470)

As can be appreciated from the foregoing description, for an arbitration with n participants, a cost $C_p$ for participant p may be determined using the following expression:

$$C_p = \frac{\sum_{i=position\ of\ ad\ of\ p}^{n} \text{offer}_{i+1}(PSR_i - PSR_{i+1})}{\sum_{i=position\ of\ ad\ of\ p}^{n} (PSR_i - PSR_{i+1})} \quad (1)$$

where increasing position i corresponds to lower (and worse performing) ad spot positions, and $PSR_i$ corresponds to the position-specific selection rate for a position i. Additionally, $\text{offer}_{n+1}$ is assumed to be the reserve price, and $PSR_{n+1}$ is assumed to be 0. Various alternative embodiments consistent with the present invention are possible under which the range of the summation is changed. However, the summation should include at least one ad spot position worse than the position of the ad of the participant. Similarly, various alternative embodiments consistent with the present invention are possible under which the selection rate difference (or some other performance parameter) of the ad spot positions is modified, and/or under which the offer is modified. Naturally, however, embodiments that ensure that an advertiser's marginal cost per selection never exceeds their maximum offer may be advantageous.

§4.3.1.1.2 Illustrative Example

In a cost determination method consistent with the present invention, such as that 400 described above with reference to FIG. 4, for each participant "p", a cost per selection is determined as a weighted average of all (or at least some) of the offers which are less than p's. In the following example, the cost per selection is determined as a weighted average of all of the offers which are less than p's. Further, in the following example, the weights are the differences in selection rates of the corresponding ad spot positions. For example, consider the following participants that had an ad placed:

| name | offer ($s) | selection rate | cost ($s) |
|---|---|---|---|
| rob | 1.400 | 1.000 | 0.593 |
| bob | 1.200 | 0.800 | 0.441 |
| tim | 1.000 | 0.700 | 0.361 |
| jim | 0.900 | 0.500 | 0.145 |
| hal | 0.700 | 0.450 | 0.083 |
| sam | 0.200 | 0.350 | 0.050 |
| reserve | 0.050 | 0.000 | — |

The "offer" column shows each participant's maximum offer, and the "selection rate" column shows the selection rate associated with each of the ad spot positions without regard to the selection rate of the particular ad (normalized to 1.0). The "cost" column shows the cost computed by using equation (1). For example, hal's cost is computed as a weighted average of sam's offer (0.20) and the reserve price (0.05), where the weights are the selection rate differences of the different ad spot positions (0.1=0.45−0.35 for sam and 0.35=0.35−0.0 for the reserve). Since equation (1) provides a weighted average, the sum of the weighted offers is divided by the sum of the weights, which is the sum of the differences in the ad spot selection rates (0.45=0.10+0.35)—that is, the selection rate of hal's slot. Thus, the cost is $0.083 (=(($0.20*0.1)+($0.05*0.35))/0.45).

In this example, the price paid by advertiser i is the average of the marginal costs associated with each of the ad positions that advertiser i beat. When an advertiser improves its position from i+1 to i, the additional cost it pays is equal to the maximum offer chosen by advertiser i+1 times the number of additional selections it gets by improving its position. This implies that the marginal price of each click will always be less than or equal to the maximum offer. For example, if hal were to increase his bid to 0.95 and move up into 4th position, his cost per selection would become $0.165 (=$0.90*(0.50−0.45)+$0.20*(0.45−0.35)+$0.05*0.35)/(0.1+0.05+0.35). Hal's cost per selection increases by $0.082 (=0.165−0.083) and his selection rate increases from 0.45 to 0.5, a difference of 0.05. His marginal cost per selection is defined as the extra cost/extra clicks, which is $0.90 (=0.082*0.45+0.165*0.05)/0.05).

Notice that hal's marginal cost per selection in 4th position is exactly equal to the amount hal needed to bid to make it into 4th position. At least some cost discounting methods consistent with the present invention always restrict marginal cost per selection so that it is less than or equal to the maximum offer. Consequently, a dominant strategy exists—it is optimal for each advertiser to offer its gross profit per selection, that is, its profit before paying advertising costs. For example, an advertiser who makes $800 in profit from 1000 selections has a gross profit per selection of $0.80. Under cost discounting techniques consistent with the present invention, it is optimal for this advertiser to offer a maximum of $0.80 per selection. Contrast this with existing price discounters where an advertiser's best maximum offer may depend on many factors unknown to the advertiser (e.g., at spot position selection rates) and/or out of its control (e.g., competitors' offers).

§4.3.1.2 Combining Offers from Known and New Cost Determination Techniques in a Single Arbitration As can be seen from the example in §4.3.1.1.2 above, new cost determination techniques consistent with the present invention may aggressively discount the cost for selections in relation to offers of others. Where a simple cost determination would have determined a cost for rob as $1.20 per selection (i.e., bob's offer), under one embodiment of a new cost determination method consistent with the present invention determines the cost for rob as only $0.593. If an ad serving system were to simply start interpreting all of the existing offers (which may have been made under the assumption that they would be discounted in accordance with a simple discounting method) as offers under the new cost determination model, the revenue of the ad serving system would be expected to drop in the short term. This would be expected because offers made assuming one cost discounting method would likely be lower than offers made assuming a more aggressive cost discounting method.

Although this drop in revenue would be expected to be a short to medium term phenomenon (because participants would likely eventually raise their offers), it would be useful if this potential for revenue shortfall could be avoided altogether by allowing offers under both cost discounting models to coexist. This may also be advantageous since it allows participants to use the model they are most comfortable with, even though cost discounters consistent with the present invention may be the best for participants. Thus, for example, it would be useful to allow some of the participants (perhaps the more savvy advertisers) to make offers to be discounted under the new cost discounter, while other participants (perhaps advertisers accustomed to less sophisticated cost discounters) can continue to make offers to be discounted under an existing cost discounter model. It might be useful to allow participants to switch to the new cost discounter model (or back to the old one) at their option while allowing the ad server to avoid a sudden drop in revenue allowing participants to avoid the worry of having the rules changed out from under them.

The main challenge with allowing the different cost discounting models to coexist is that different participants may enter their offers under different assumptions. Participants using a simple cost discounting method which keeps them ahead of the next lower participant may reduce their offers to some extent (consciously or not) because this cost discounting model restricts only the average cost of selections—not the marginal cost. Since a new cost discounting model consistent with the present invention restricts the marginal cost, participants operating under the new model can safely make higher offers. (In fact, the optimal bid under the new cost discounting model is equal to the participant's gross profit per selection.)

In a combined arbitration method in which some maximum offers are specified under a known (position arbitration) method ("known model") and other maximum offers are specified under a new method consistent with the present invention ("new model"), the maximum offers given under the new model can be converted into maximum offers under the known model and vice versa. Then a "combined arbitration" can be run using maximum offers expressed under either model. In one embodiment consistent with the present invention, a "combined arbitration" includes two steps. First, the maximum offers are ordered from highest to lowest. Second, the maximum offers expressed under the new model are converted into maximum offers expressed under the known model. Then, a normal arbitration and cost discounting under the known model can be run using the combined sets of maximum offers.

In at least some embodiments consistent with the present invention for performing a "combined arbitration," the maximum offers are ordered from highest to lowest using the following procedure. First, a set of maximum offers "K" expressed under the known (position arbitration) model is collected (the "known-model offers"), and a set of maximum offers "N" expressed under a new model consistent with the present invention is collected (the "new-model offers"). Then, both sets of maximum offers are sorted in descending order. Then, the sets of maximum offers are interleaved with each other so that a total ordering of the maximum offers is achieved, which respects the ordering of the maximum offers collected for each of the two arbitration models. Desirable methods for achieving this interleaving are discussed in section 4.3.1.2.3 below.

In at least some embodiments consistent with the present invention for performing a "combined arbitration," a corresponding "new arbitration model maximum offer" (or "new-model offer") Ni is determined for each known-model maximum offer Ki. In addition, a corresponding "known arbitration model maximum offer" (or "known-model offer") Ki is determined for each new-model maximum offer Ni.

Once the maximum offers have been ordered and interleaved, the missing Ni and Ki values may be computed, in ascending order of maximum offers, by the following formulas, derived from the definition of marginal cost:

$$N_i = \frac{(K_i \cdot PSR_{i-1} - K_{i+1} \cdot PSR_i)}{(PSR_{i-1} - PSR_i)} \quad (2)$$

and $$K_i = \sum_{for\ all\ j \geq i} \frac{N_j(PSR_{j-1} - PSR_j)}{PSR_{j-1}} \quad (3)$$

Where PSRi is the position-specific selection rate for position i.

These formulas are equivalent, as can be seen by substituting the definition of Ni from equation (2) into equation (3).

Equation (2) may be used to compute a new-model offer for position i when the known-model offers are already known for positions i and i+1. Intuitively, this formula computes the marginal cost per selection that a new model participant would pay in position i−1. This is calculated as the cost of being in position i−1 minus the cost of being in position i, divided by the difference in the selection rates of ad spot positions i−1 and i.

Equation (3) may be used compute a known-model offer for position i ($K_i$) when all of the new-model offers are available for all positions greater than (i.e. in worse position than)

or equal to i ($N_j$, where j≥i). Equation (3) may be expressed by the following algorithm, which computes the weighted average of the worse-positioned bids:

sum=0
    for all j>=i:
        sum+=N[j]*(x[j-1]-x[j])
    K[i]=sum/x[i-1]

where the position-specific selection rates of the ad positions are stored in array x. Equation (3) and the foregoing algorithm essentially compute the cost participant i−1 would pay under the new model, and assigns it to the known-model offer for participant i, thus ensuring that participant i−1 pays the same amount under each model.

In at least some embodiments consistent with the present invention, the net profit that each new-model participant derives from each ad impression may be determined. For example, the net profit of such an advertiser may be determined by first finding the difference between the participant's new-model maximum offer and the price the advertiser actually pays per selection (e.g., as computed by pricing equations (2) and (3)). Then, this difference may be multiplied by the selection rate of the ad position the participant's ad occupies to determine the participant's net profit.

§4.3.1.2.1 Arbitrations with Only New Cost Discount Model Participants

As discussed in §4.3.1.2 above, since all the bids cannot simply by lumped together before an arbitration is run, offers specified under one model should be converted into equivalent offers under the other model. When all participants express their offers under the new model, equation (3) can be used to convert these offers.

The following table shows the same participants as in the previous example in section 4.3.1.1.2 above.

| name | model | k_offer | n_offer | selection rate |
|---|---|---|---|---|
| rob | n | -.--- | 1.400 | 1.000 |
| bob | n | 0.593 | 1.200 | 0.800 |
| tim | n | 0.441 | 1.000 | 0.700 |
| jim | n | 0.361 | 0.900 | 0.500 |
| hal | n | 0.145 | 0.700 | 0.450 |
| sam | n | 0.083 | 0.200 | 0.350 |
| reserve |  | 0.050 | 0.050 | 0.000 |

An "n" in the "model" column indicates that the offer was expressed under the new model. The "n_offer" column shows the new-model offer. The "selection rate" column shows the position-specific selection rate of each ad spot position. The "k_offer" column shows the corresponding known-model offer—which is equal to the amount that the next higher-positioned participant must pay. The "k_offer" column here is exactly the same as the cost column from the previous example, shifted down one row.

§4.3.1.2.2 Arbitration where an Known Cost Discounting Model Participant is Added Suppose that a single known-model participant (kate) joins the arbitration offering $0.56, and is assigned to the 3rd position (in accordance with a position assignment method consistent with the present invention). Kate's n_offer is determined such that equation (3) produces an k_offer for kate which corresponds to her actual offer ($0.56). In this case, equation (2) may be used to determine an n_offer of $1.08 for kate. The table becomes:

| name | model | k_offer | n_offer | selection rate |
|---|---|---|---|---|
| rob | n | -.--- | 1.400 | 1.000 |
| bob | n | 0.688 | 1.200 | 0.800 |
| kate | o | 0.560 | 1.080 | 0.700 |
| tim | n | 0.486 | 1.000 | 0.500 |
| jim | n | 0.280 | 0.900 | 0.450 |
| hal | n | 0.211 | 0.700 | 0.350 |
| sam | n | 0.071 | 0.200 | 0.300 |
| reserve |  | 0.050 | 0.050 | 0.000 |

Once the missing offers (k_offers for the new-model participants and the n_offer for kate) have been determined, a normal known-model arbitration can be run using the offers in the k_offer column. In this example, the cost per selection for rob would be $0.688, the cost per selection for bob would be $0.560, the cost per selection for kate would be $0.486, etc.

To find all the missing offers in the general case where some advertisers make maximum cost offers under the known model and some make maximum cost offers under the new model, start at the lowest position and work upward, using the appropriate formula (e.g., equation (2) or (3)) to calculate the missing new-model or known-model offer.

§4.3.1.2.3 Position Assignment

The foregoing sections described how offers can be converted from an known model offer to a new model offer, and from a new model offer to an known model offer. However, the described conversion techniques presumed that the participants were in the proper positions. This section describes how participants may be assigned to positions, given a set of known-model participants and a set of new-model participants, before the missing offers are determined and the arbitration and cost discounting.

In at least some embodiments consistent with the present invention, the relative ordering of the maximum offers is determined iteratively, based on the net profit derived by the new-model participants. In one embodiment, an ordering is chosen, and offers (i.e., new-model maximum offers) for each missing position are determined (e.g., using equation (2), or a similar method). Then the ordering of the maximum offers is adjusted iteratively in order to maximize the net profit of the new-model participants.

Figure 5:
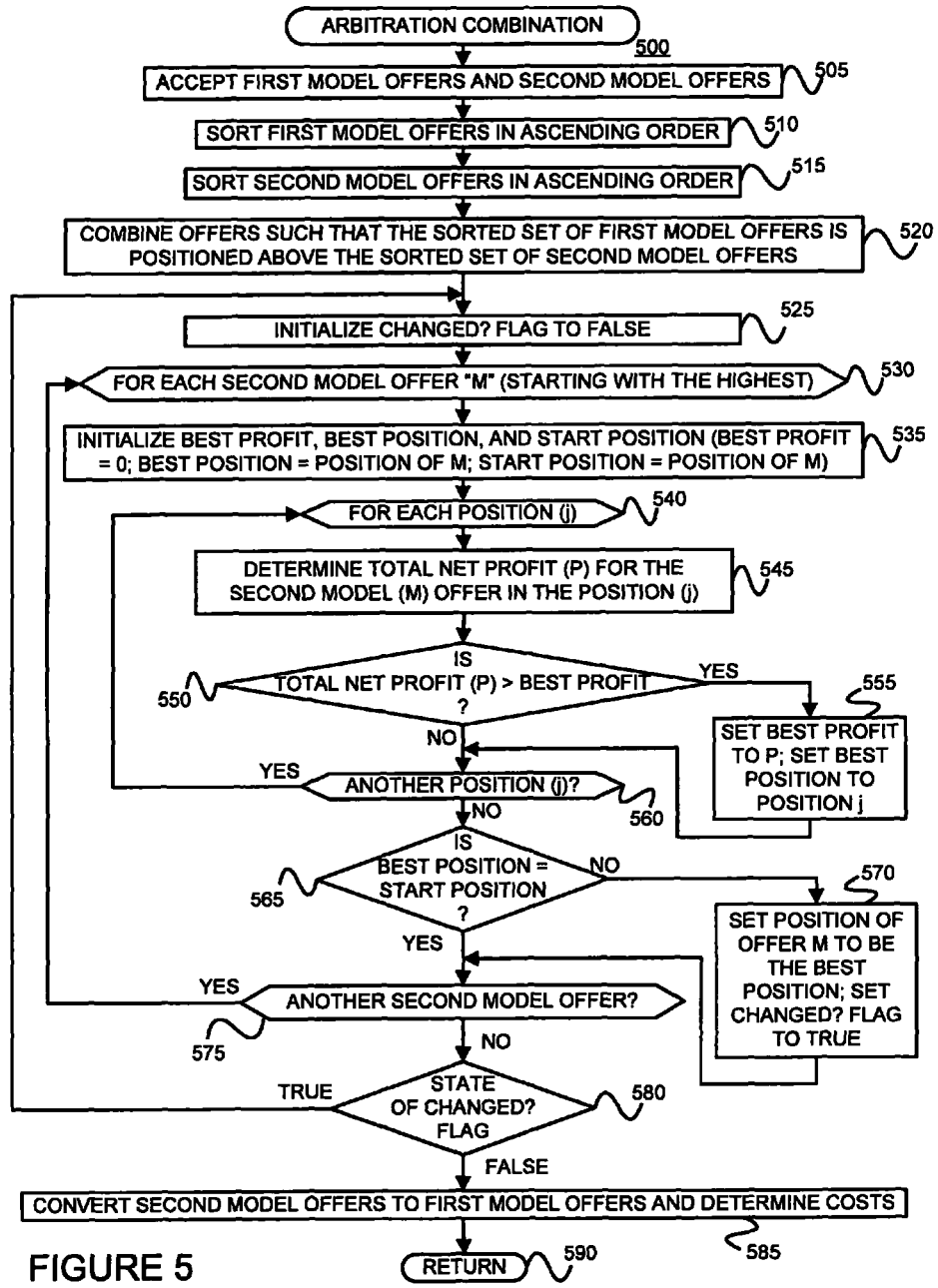
FIG. 5 is a flow diagram of an exemplary method for combining offers, assuming different cost discounting methods, in a single arbitration in a manner consistent with the present invention.

FIG. 5 is a flow diagram of an exemplary method 500 that may be used to order the position of offers from different cost discounting models. First and second (e.g., known-model and new-model) cost determination offers are accepted. (Block 505) In the following, these will simply be referred to as "first-model offers" and "second-model offers" for brevity. The sets of each of the first- and second-model offers are sorted by descending maximum offer. (Blocks 510 and 515) Then the ordered sets of maximum offers are combined by placing all of the first-model offers above all of the second model offers. (Block 520) A "CHANGED?" flag is initialized (i.e., set to FALSE). (Block 525) As indicated by loop 530-575, a number of acts is performed for each second-model offer, starting with the highest second-model offer. As will be appreciated, depending on a state of the CHANGED? flag, the loop 530-575 may be repeated.

Briefly stated, each of the second-model offers are allowed to "bubble up" until they reach an ad spot position that maximizes its net profit. When the best ad spot position has been determined, the participant is put in that position and the next second-model offer is then processed. Positioning and re-positioning the second-model offers is continued until all are optimally positioned (e.g., when no position has changed in the last iteration). Referring to FIG. 5, this may be done as follows.

A best profit, a best position and a start position for the second-model offer are initialized. (Block 535) For example, a best profit may be set to zero, and both a best position and a start position may be set to the current position of the second-model offer. As indicated by loop 540-560, a number of acts is then performed for each position j. The loop 540-560 may cycle through each position (i.e., all possible positions), or may only cycle through positions above the start position of the second model offer, and/or below the best position of the previous second model offer. Then, a total net profit (which may be referred to simply as "profit" below for brevity) for the second-model offer is determined. (Block 545) Profit may be defined as a difference between how much is gained and how much is spent. For example, profit may be defined as follows:

$$\text{profit} = \text{offer per selection} \cdot \text{PSR} - \text{cost per selection} \cdot \text{PSR} \quad (4)$$

Cost per selection may be determined using equations (2) and (3). Note that the profit may be negative. If the profit is greater than the best profit, the best profit is set to the current value of profit and the best position is set to the current position (i.e., j) and the method 500 proceeds to block 560 to continue the loop 540-560. (Blocks 550 and 555) If, on the other hand, the profit is not greater than the best profit, the method 500 proceeds to block 560 to continue the loop 540-560. (Block 550)

The loop 540-560 continues until all positions j of the loop have been processed. Once the loop 540-560 has finished, it is determined whether or not the best position=the start position. (Block 565) If not, the position of the offer M is set to be the best position and the CHANGED? flag is set to true (Block 570) before the method 500 proceeds to block 575 to continue the loop 530-575. Referring again to block 565, if the best position=the start position, the method 500 proceeds to block 575 to continue the loop 530-575. Now referring to block 575, if another second-model offer remains to be processed, the method 500 branches back to block 530. Otherwise, if all of the second model offers have been processed, it is determined whether or not the CHANGED? flag is TRUE. (Block 580) If the CHANGED? flag is TRUE, the method 500 branches back to block 525 for another iteration of the loop 530-575. If, on the other hand, the CHANGED? flag is not FALSE, the method continues to block 585 where the now properly positioned second-model offers are converted to first model offers and costs are determined using the first cost determination model, before the method 500 is left. (Node 580)

The following algorithm may be used to assign positions as done by the method 500, where the first offers are known cost determination model offers and the second offers are new cost determination model offers:

known_offers.sort( )
   new_offers.sort( )
   offers=known_offers+new_offers
   changed=true
   while changed:
      changed=false
      for each position i containing a new-model offer N
         best_profit=0
         best_position=i
         for each position j:
            find N's total net profit p in position j
            if p>best_profit:
               best_profit=p
               best_position=j
         if best_position≠i:
            move new_offer N to best_position
            changed=true This algorithm starts all the offers of the new-model participants below all of the offers of the known-model participants, and bubbles the new-model offers up into the positions which maximize their profit. A profit is calculated as the difference between the cost per selection offer and actual billed cost per offer, times the selection rate of the present ad position, as given in Equation (4). Since this computation needs the missing offers to be recalculated, a number of iterations may be needed (until no change in position occurs). A simulation of a million random arbitrations of 5-15 participants suggests that the foregoing algorithm reliably terminates after only a few iterations.

Referring back to block 585, in an alternative, once the final positions of the offers are determined, any first (e.g., known) model offers can be converted to the second (e.g., new) model offers and the costs can be determined using the new cost determination model.

A number of optimizations can be applied to the foregoing method 500 and algorithm. For example, the set of candidate positions (the j's) can be restricted to the positions equal to or above the new-model participant's current position, but below the position occupied by the next higher new-model participant. Alternatively, or in addition, not every new-model participant need be examined on each iteration of the outer loop. Rather, a participant needs to be examined only if the next higher new-model participant changed (was bubbled upward) on the given iteration (making new possible positions available), or if any lower new-model participant was bubbled upward on the previous iteration (changing the profit calculation for the participant).

Alternate Position-Assignment Method

In an alternative embodiment, the following algorithm may be used to perform position assignment and to calculate missing offers in one pass:

k_offers.sort( )//in ascending order
   n_offers.sort( )//in ascending order
   final_offers=[ ]
   while !k_offer.empty( ) && !n_offers.empty( ):
      n_offer=n_offer[0]
      k_offer=k_offer[0]
      effective_n_offer=(convert k_offer to a new offer given final_offers so far)
      if n_offer<effective_n_offer:
         final_offers.append(n_offer)
         n_offers.pop_front( )
      else:
         final_offers.append(effective_n_offer)
         k_offers.pop_front( )
   . . . copy over leftover n_offers or k_offers arrays . . . .

The foregoing algorithm starts with sorted lists of the known-model and new-model offers. It computes the list of final new-model offers from highest (worst) position to lowest (best) position. At each step, it computes the new offer for the lowest known-model participant, and compares that to the lowest new-model participant. The lower of the two is taken and appended to the output offer list. This is repeated until done.

The running time of this algorithm is linear in the number of ads, as the conversion function from known-model offer to new-model offer is constant time. Known-model offers could be compared instead, but it is more difficult to compute the known-model offer from the new-model offer in constant time because partial sums of offers already in final_offers need to be maintained. This alternative algorithm is disadvantageous in that it does not always choose the positions which maximize the profit of the new-model participants. Since the earlier algorithm typically converges to a solution in a few passes, it is generally preferred.

§4.3.2 Simple Price and Performance Ad Scoring Model

The examples presented in §4.3.1 above used straight offers instead of effective CPI (the product of the offer and the creative-specific selection rate of the particular ad creative) to position the participants in the arbitration. Examples that use effective CPI are provided in below. Generally, to convert to the effective CPI based arbitration, each offer is multiplied by the corresponding creative's creative-specific selection rate (CSR) before running the arbitration, and each billed cost-per-selection is divided by the creative's creative-specific selection rate afterwards.

§4.3.2.1 New Cost Determination Technique For Use with Price and Performance Ad Scoring Model The following assumes that positioning is still determined using a product of a cost per selection offer and the creative-specific selection rate of the ad creative ("CSR"). This product is referred to as effective cost per impression ("eCPI") The top position goes to the ad with the highest eCPI, the second position goes to the ad with the second highest eCPI, and so on.

Figure 6:
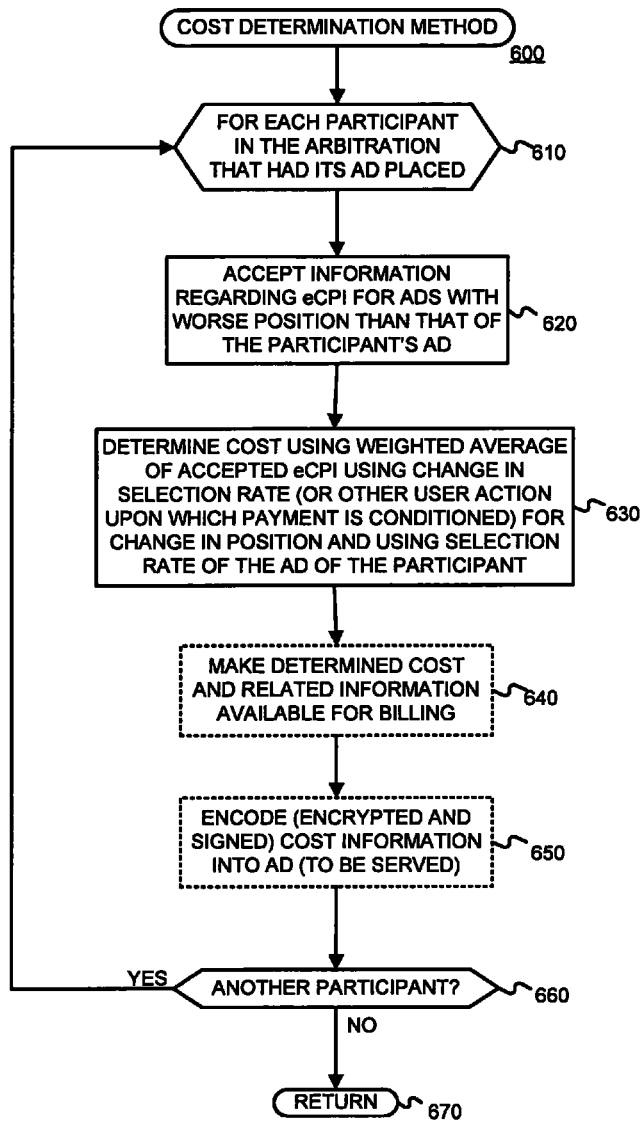
FIG. 6 is a flow diagram of an exemplary method that may be used to discount a cost in a manner consistent with the present invention.

FIG. 6 is a flow diagram of an exemplary method 600 that may be used to determined a cost in a manner consistent with the present invention. As indicated by loop 610-660, a number of acts may be performed for each participant (e.g., each advertiser participating in the arbitration) that had an ad placed. Information regarding eCPIs for ad(s) with worse position(s) that that of the participant's ad is accepted. (Block 620). This information is used in a cost determination. For example, a cost may be determined using a weighted average of the accepted eCPI. (Block 630) The weighting may be determined using a change in the position-specific selection rate (or some other user action upon which payment is conditioned) between the position of the participant's ad and the position(s) of the other ad(s). Note that the positions may have a general position-specific selection rate (e.g., averaged over a group of ads, or over all ads). Generally, the position-specific selection rate will monotonically decrease as the ad spot position becomes lower. Note that the change in position-specific selection rate used for weighting concerns that due to the ad spot position, not the creative-specific selection rate of the creative.

Once the cost is determined, the determined cost (and related information) should be made available for billing. (Block 640) Alternatively, or in addition, the determined cost can be encoded into the ad information served. (Block 650) This encoded determined cost information may be encrypted and/or signed for security purposes. When the participants have been processed, the method 600 may be left. (Node 670)

As can be appreciated from the foregoing description, for an arbitration with n participants, a cost $C_p$ for participant p may be determined using the following expression:

$$C_p = \frac{\sum_{i=position\ of\ ad\ of\ p}^{n} offer_{i+1} \cdot CSR_{i+1}(PSR_i - PSR_{i+1})}{CSR_p \sum_{i=position\ of\ ad\ of\ p}^{n} (PSR_i - PSR_{i+1})} \quad (5)$$

where increasing position i corresponds to lower (and worse performing) ad spot positions. $CSR_i$ is the creative-specific selection rate of the ad in position i, and $PSR_i$ is the position-specific selection rate of position i. Additionally, $offer_{n+1}$ is assumed to be the reserve price, $CSR_{n+1}$ is assumed to be 1, and $PSR_{n+1}$ is assumed to be 0. Various alternative embodiments consistent with the present invention are possible under which the range of the summation is changed. However, the summation should include at least one ad spot position worse than the position of the ad of the participant. Similarly, various alternative embodiments consistent with the present invention are possible under which the selection rate difference (or some other performance parameter) of the ad spot positions is modified, and/or under which the offer is modified. Naturally, however, embodiments that ensure that an advertiser's marginal per-selection cost never exceeds their maximum offer may be advantageous.

§4.3.2.2 Combining Offers from Known and New Cost Determination Techniques

As discussed in §4.3.1.2 above, it may be desirable to combine known and new cost determination model offers. Once the maximum offers have been ordered, the missing Ni and Ki values may be computed, in ascending order of maximum offers, by the following formulas, which are similar to equations (2) and (3), derived from the definition of marginal cost:

$$N_i = \frac{(CSR_i \cdot K_i \cdot PSR_{i-1} - CSR_{i+1} \cdot K_{i+1} \cdot PSR_i)}{CSR_i \cdot (PSR_{i-1} - PSR_i)} \quad (6)$$

and $$K_i = \frac{1}{CSR_i} \cdot \sum_{for\ all\ j \geq i} \frac{CSR_j \cdot N_j \cdot (PSR_{j-1} - PSR_j)}{PSR_{j-1}} \quad (7)$$

These formulas are equivalent, as can be seen by substituting the definition of Ni from equation (6) into equation (7).

Figure 7:
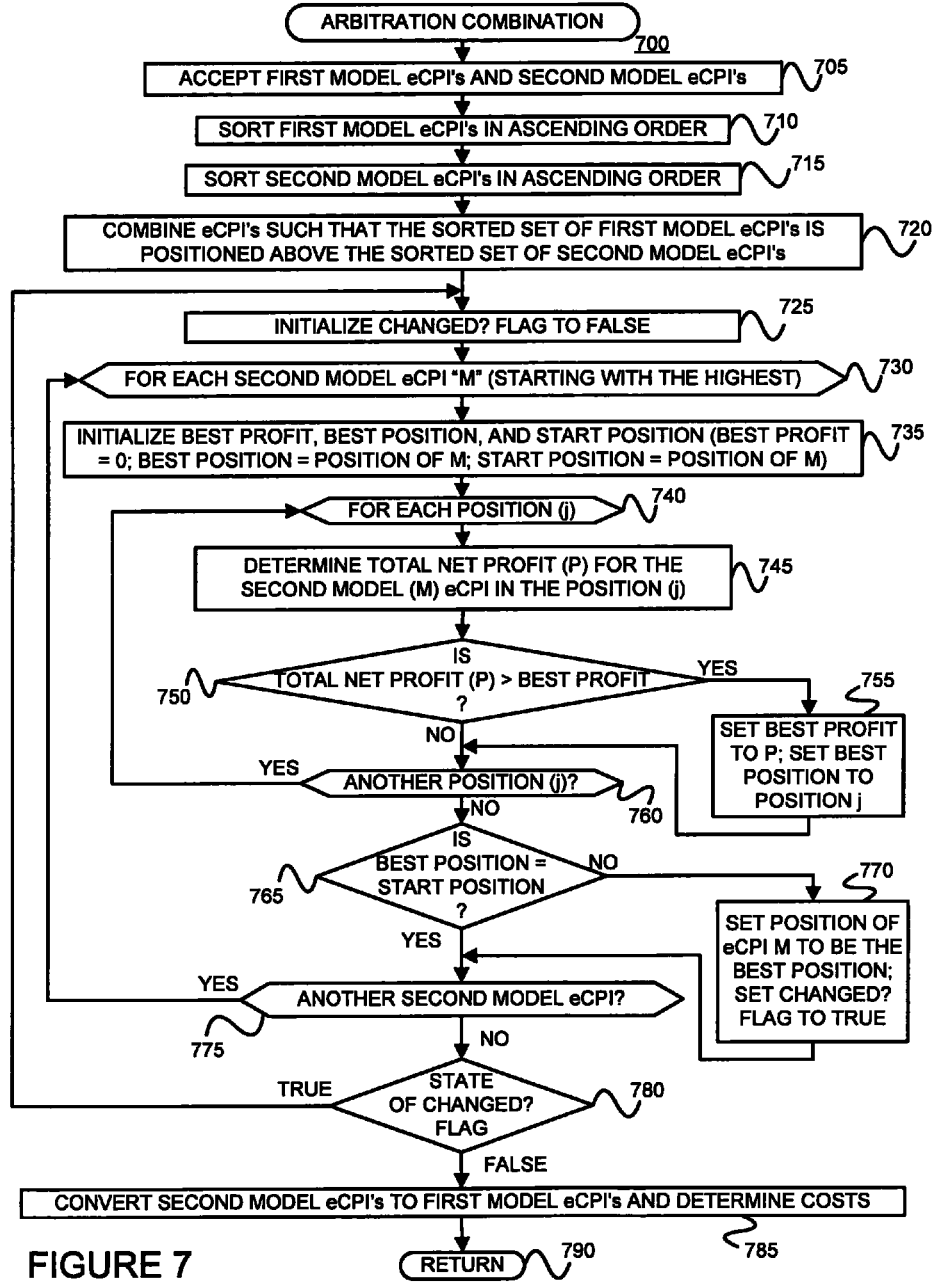
FIG. 7 is a flow diagram of an exemplary method for combining offers, assuming different cost discounting methods, in a single arbitration in a manner consistent with the present invention.

FIG. 7 is a flow diagram of an exemplary method 700 that may be used to order the position of eCPI's from different cost discounting models. First and second (e.g., known and new) cost determination eCPI's are accepted. (Block 705) In the following, these will simply be referred to as "first-model eCPI's" and "second-model eCPI's" for brevity. The sets of each of the first-model and second-model eCPI's are sorted by descending maximum eCPI. (Blocks 710 and 715) Then the ordered sets of eCPI's are combined by placing all of the first model eCPI's above all of the second model eCPI's. (Block 720) A "CHANGED?" flag is initialized (e.g., set to FALSE). (Block 725) As indicated by loop 730-775, a number of acts is performed for each second model eCPI, starting with the highest second-model eCPI. As will be appreciated, depending on a state of the CHANGED? flag, the loop 730-775 may be repeated.

Briefly stated, each of the second-model eCPI's are allowed to "bubble up" until they reach an ad spot position that maximizes its net profit. When the best ad spot position has been determined, the participant is put in that position and the next second-model offer is then processed. Positioning and re-positioning the second-model eCPI's is continued until all are optimally positioned (e.g., when no position has changed in the last iteration). Referring to FIG. 7, this may be done as follows.

A best profit, a best position and a start position for the second-model eCPI are initialized. (Block 735) For example, a best profit may be set to zero, and both a best position and a start position may be set to the current position of the second model eCPI. As indicated by loop 740-760, a number of acts is then performed for each position j. The loop 740-760 may cycle through each position (e.g., all possible positions), or may only cycle through positions above the start position of the second model eCPI, and/or below the best position of the previous second model eCPI. Then, a total net profit (which may be referred to simply as "profit" below for brevity) for the second model eCPI is determined. (Block 745) Profit may be defined as a difference between how much is gained and how much is spent. For example, profit may be defined as follows:

$$\text{profit} = \text{offer per selection} \cdot \text{PSR} - \text{cost per selection} \cdot \text{PSR} \qquad (8)$$

The net profit is how much the participant derives from each ad impression. In one embodiment, the net profit of such a participant may be determined by first finding the difference between the participant's new-model maximum offer and the price the advertiser actually pays per click (e.g., as computed by the pricing formulas given in equation (6) (5)). Then, this difference may be multiplied by the selection rate of the ad position the advertiser's ad occupies to determine the advertiser's net profit.

Cost per selection may be determined using equation (7). Note that the profit may be negative. If the profit is greater than the best profit, the best profit is set to the current value of profit, and the best position is set to the current position (i.e., j) and the method 700 proceeds to block 760 to continue the loop 740-760. (Blocks 750 and 755) If, on the other hand, the profit is not greater than the best profit, the method 700 proceeds to block 760 to continue the loop 740-760. (Block 750)

The loop 740-760 continues until all positions j of the loop have been processed. Once the loop 740-760 has finished, it is determined whether or not the best position=the start position. (Block 765) If not, the position of the eCPI M is set to be the best position and the CHANGED? flag is set to true (Block 770) before the method 700 proceeds to block 775 to continue the loop 730-775. Referring again to block 765, if the best position=the start position, the method 700 proceeds to block 775 to continue the loop 730-775. Now referring to block 775, if another second-model eCPI remains to be processed, the method 700 branches back to block 730. Otherwise, if all of the second model eCPI's have been processed, it is determined whether or not the CHANGED? flag is TRUE. (Block 780) If the CHANGED? flag is TRUE, the method 700 branches back to block 725 for another iteration of the loop 730-775. If, on the other hand, the CHANGED? flag is not FALSE, the method continues to block 785 where the now properly positioned second-model eCPIs are converted to first-model eCPIs and costs are determined using the first cost determination model, before the method 700 is left. (Node 780)

The following algorithm may be used to assign positions as done by the method 700, where the first-model offers are known cost determination model offers and the second-model offers are new cost determination model offer:

```
known_eCPIs.sort( )
new_eCPIs.sort( )
eCPIs=o_eCPIs+n_eCPIs
changed=true
while changed:
    changed=false
    for each position i containing a new-model eCPI E
        best_profit=0
        best_position=i
        for each position j:
            find E's total net profit p in position j
            if p>best_profit:
                best_profit=p
                best_position=j
        if best_position≠i:
            move n_eCPI E to best_position
            changed=true
```

This algorithm starts all the eCPI's of the new-model participants below all of the eCPI's of the known-model participants, and bubbles the new-model eCPI's up into the positions which maximize their profit. A profit is calculated as the difference between the offer per selection and actual determined cost per selection, times the selection rate of the present ad position. Since this computation needs the missing eCPIs to be recalculated, a number of iterations may be needed (until no change in position occurs).

Referring back to block 785, in an alternative, once the final positions of the eCPI's are determined, any first (e.g., known) model eCPI's can be converted to the second (e.g., new) model eCPI's and the costs can be determined using the new cost determination model.

A number of optimizations, such as those discussed above with reference to method 500, can be applied to the foregoing method 700 and algorithm.

§4.3.3 Billing

Figure 8:
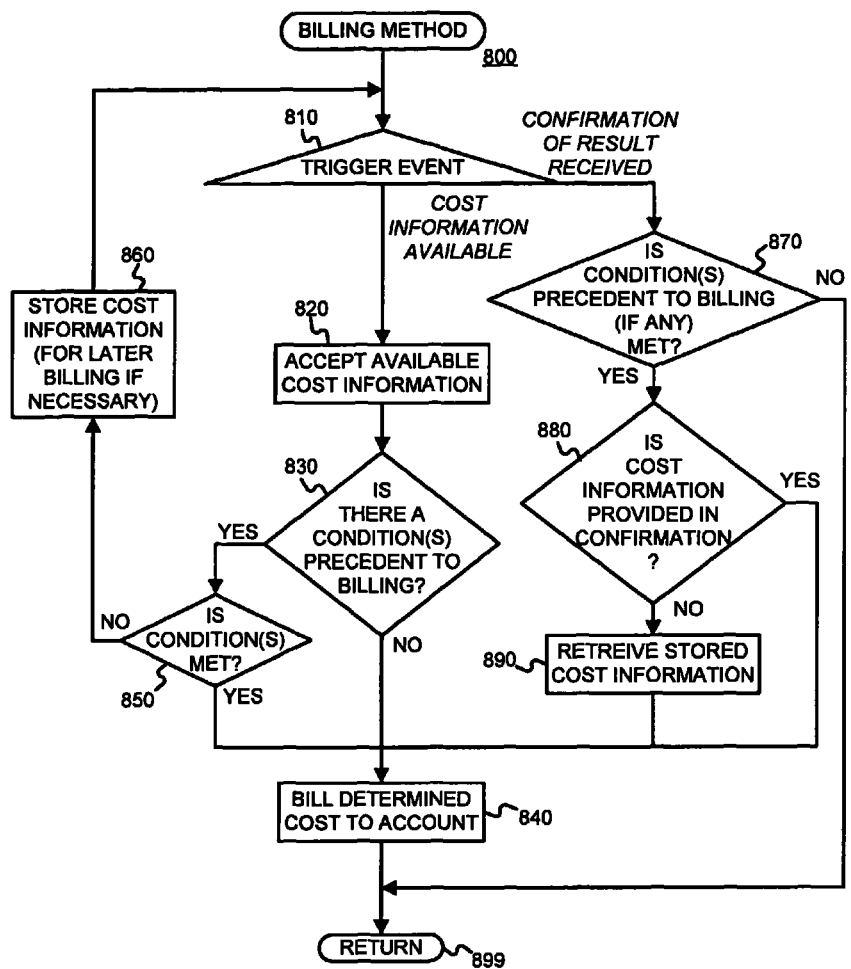
FIG. 8 is a flow diagram of an exemplary method for performing a billing operation in a manner consistent with the present invention.

FIG. 8 is a flow diagram of an exemplary method 800 that may be used to effect billing operations 228. As shown, if cost information is available, such information is accepted. (Blocks 810 and 820) Then, it is determined whether or not there is a condition(s) precedent to billing. (Block 830) That is, if an advertiser agrees to pay only when its ad is selected or only when conversion occurs, a condition precedent (e.g., selection or conversion) needs to occur before that advertiser is billed, even if its ad was served. If, on the other hand, the advertiser agrees to pay a maximum cost per impression, it can be billed once its ad is served. If there is a condition(s) precedent to billing, it is determined whether or not this condition(s) is met. (Block 850) If not, the cost information is stored (for later billing, if necessary) (Block 860), and processing returns to the trigger block 810. If, on the other hand, the condition(s) is met, the determined cost can be billed to the advertiser's account (Block 840), before the method 800 is left (Node 899). Referring back to decision block 830, if there is no condition(s) precedent to billing, the determined cost can simply be billed to the advertiser's account (Block 840) before the method 800 is left (Node 850).

Referring back to trigger block 810, if a confirmation of a result(s) is received (e.g., via the result interface operation(s) 260), it is determined whether or not a condition(s) precedent to billing, if any, is met. (Block 870) If not, the method 800 is left. (Node 899) If, on the other hand, the condition(s) precedent to billing, if any, is met, processing continues to decision block 880 where it is determined whether or not a determined cost information was provided with the result confirmation. If so, the determined cost is billed (Block 840), before the method 800 is left (Node 899). Referring back to decision block 880, if, on the other hand, the determined cost information is not provided in the result confirmation, then (assuming that the determined cost information was previously stored (Recall block 860.)) stored determined cost information is retrieved (Block 890), before the determined cost amount is billed (Block 840) and the method 800 is left (Node 899).

§4.3.4 Apparatus

Figure 9:
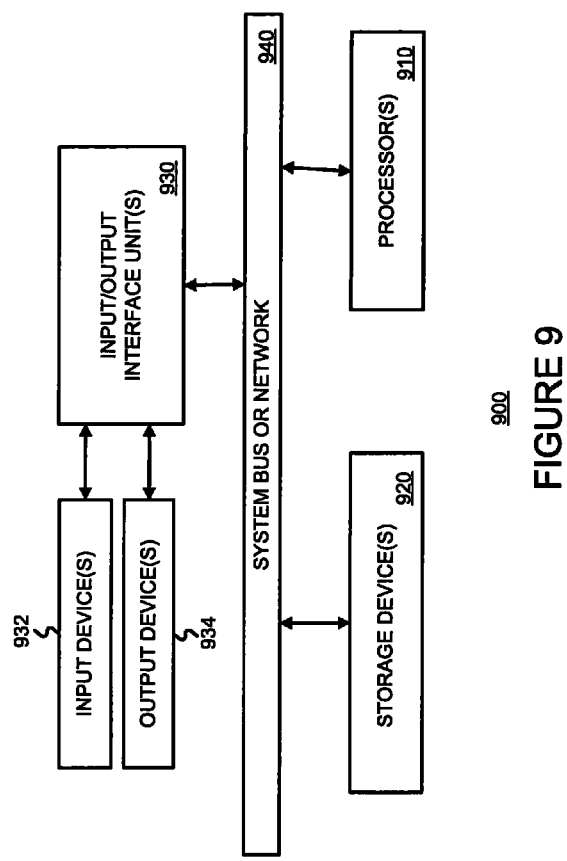
FIG. 9 is a block diagram of an exemplary apparatus that may perform various operations and store various information in a manner consistent with the present invention.

FIG. 9 is high-level block diagram of a machine 900 that may perform one or more of the operations discussed above.

The machine 900 basically includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930.

The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 920 and/or may be received from an external source via one or more input interface units 930.

In one embodiment, the machine 900 may be one or more conventional personal computers. In this case, the processing units 910 may be one or more microprocessors. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. The output devices 934 may include a monitor or other type of display device, which may also be connected to the system bus 940 via an appropriate interface. In addition to (or instead of) the monitor, the personal computer may include other (peripheral) output devices (not shown), such as speakers and printers for example.

The various operations described above may be performed by one or more machines 900, and the various information described above may be stored on one or more machines 900. The ad server 210, search engine 220, content server 230, e-mail server 240, and/or user device 250 may include one or more machines 900.

§4.3.5 Alternative Embodiments and Refinements

Although the present invention was described in the context of offers per selection, it may be used with offers for other events and other user behaviors, such as measurable user behaviors like conversion, etc. These other events, such as other user behaviors, may have a value to an advertiser.

Although many of the foregoing examples described the present invention in the context of arbitrating ad spot positions, embodiments consistent with the present invention may be used to arbitrate other ad presentation attributes such as size, time slot, enhanced features, etc. Ad presentation attributes, or combinations or ad presentation attributes may be referred to as "ad treatments". Different ad treatments may have different selection rates (e.g., average selection rates over all ads or over a collection of ads), just as different ad spot positions can have different selection rates.

Although many of the foregoing examples described the invention in the context of arbitration schemes that determine a position solely using price, or using price information and performance information, embodiments consistent with the present invention can be used in arbitrations using other scoring methodologies (e.g., scoring using, at least, one or more of maximum offer, some other price information such as a offer, actual and/or expected ad performance, advertiser quality, etc.) In such embodiments, "offer" or "eCIP" may be replaced with the score used to assign ad positions (and/or ad treatments).

Although the present invention was described in the context of display, it may be used in the context of other content rendering devices.

In at least some embodiments consistent with the present invention, an optional reserve price may be specified. In such embodiments, all submitted maximum offers must meet or exceed the reserve price. In such embodiments, if there are m<n+1 advertisers, then advertisers m+1 through n+1 can be simulated by a "reserve advertiser," which chooses a maximum offer equal to the reserve price.

In some instances, an arbitration may be performed for a number of ads m over a number of Webpage views, where each Webpage view has n<m ad spots. For example, suppose a search engine generates four pages of search results, each with ten (10) ad spots. Although there is a potential to render forty (40) ads, this depends on whether a user requests subsequent pages of search results. The expected selection rate of an ad spot may be per Webpage view, or per collection of Webpage views. Thus, if there are m>n ads, then the primary display shows only the n highest-scoring ads. A user may choose to view a second Webpage of ads which displays ads n+1 through 2n. In general, the $i^{th}$ Webpage of ads shows the ads which rank from n(i−1)+1 through ni. In one embodiment consistent with the present invention, for purposes of calculating the average selection rates of each ad position, an ad is considered shown whenever any Webpage of ads from its arbitration is shown, regardless of whether the ad's position falls within the range of ads actually rendered on the rendered Webpage. That is, the selection rate may be selections per arbitration (i.e., expected selections per arbitration) rather than selections per actual impression. In an alternative embodiment, the number of ads provided may be limited to n, and the same set of ads may be provided on each of the Webpage views.

In at least some embodiments consistent with the present invention, ads can be rendered on different web properties (Websites), not just one main Website. The additional web properties may display different numbers of ads. In such embodiments, the ad spot position-based (or ad treatment-based) selection rates may be determined for each individual Web property, across a collection Web properties, or across all Web properties. These selection rates may be combined or mixed in various ways.

In at least some embodiments consistent with the present invention, any of the cost information used may be presented to advertisers. The advertisers may use such information to determine how to specify information that best achieves their advertising goals. For example, maximum cost per result offer information may be provided so that advertisers can determine how they wish to offer relative to other advertisers' offers. Alternatively, or in addition, actual cost per result charged may be provided. Similarly, performance information (average selection rate, average conversion rate, impressions/day, etc.), cost information (marginal costs, average billed cost per selection or conversion, etc.) and results information (average billed amount per day, average position, etc.) can be provided to advertisers. Advertisers can use such information to assist them in making their ads achieve their goals (e.g. by alerting advertisers that ad creatives should be modified, maximum offer amounts increased or decreased to achieve or maintain a certain position or preference, etc.).

The present invention includes various other embodiments resulting from combining one or more of the features listed above.

§4.4 CONCLUSIONS

Arbitration models consistent with the present invention may provide advertisers with a dominant participation strategy (that is, a strategy for making maximum offers which is always optimal, independent of what the other advertisers do and independent of the relative values of ad spot positions or some other ad treatment). If the offers are maximum offers per selection, the dominant maximum offer is the value of a selection to the advertiser, such as its average gross profit per selection. Since the dominant maximum offer does not depend on the behavior of the competition, nor on the relative selection rates of the different ad positions (or some other ad treatments), the advertiser does not have to monitor its competition or change its maximum offer unless its conversion rate or profit per conversion changes.

Embodiments consistent with the present invention permit the marginal cost per selection to be restricted. For example, using some embodiments consistent with the present invention, a participant's marginal cost per selection will never exceed its maximum offer per selection. Under such embodiments, when a participant advances to a higher ad position, the price paid for all selection increases, but only because new selections are obtained.

At least some embodiments consistent with the present invention permit an ad server to introduce a new cost determination technique gradually, by facilitating the running a combined arbitration in which some offers are made under a first cost discounting assumption and other offers are made under a second cost discounting assumption. This allows an ad server to accurately test advertiser reaction to the new cost discounting model without disturbing the other advertisers that want to continue using an existing or different cost discounting model. The ad server can avoid sudden decreases in revenue that would otherwise likely occur if more aggressive cost discounting were applied before participants changed their offers in response to such aggressive cost discounting.

What is claimed is:

1. A method comprising:
  a) accepting advertisements at a processor via an input interface to be placed in advertising positions, each of the advertisements having an associated maximum offer per result;
  b) determining for at least one advertisement a marginal cost of increasing the maximum offer per result to move into a higher advertising position;
  c) computing an advertisement cost by the processor for the at least one advertisement as a function of information related to advertisements in lower advertising positions, such that the marginal cost per result cannot exceed the maximum offer per result;
  d) determining an advertising position for the at least one of the advertisements in relation to the computed advertisement cost; and
  e) transmitting to a display the at least one of the advertisements in the determined advertising position.

2. The method of claim 1 wherein the marginal cost is defined as an amount of increase of the advertisement cost of all results divided by a number of additional results obtained by the increase of the maximum offer per result.

3. The method of claim 1 wherein the result is selected from a group of results consisting of (A) an impression of the advertisement, (B) a selection of the advertisement, and (C) a conversion on the advertisement.

4. The method of claim 1 wherein the advertisements are scored based solely on the maximum offers per result associated with the advertisements, and
  wherein the advertisements are assigned to ad spot positions in accordance with their scores.

5. The method of claim 4 wherein the ad spot positions have result performances that monotonically decrease.

6. The method of claim 4 wherein each of the ad spot positions has a selection rate, and wherein the selection rates of the ad spot positions monotonically decrease.

7. The method of claim 4 wherein each of the ad spot positions has a conversion rate, and wherein the conversion rates of the ad spot positions monotonically decrease.

8. The method of claim 1 wherein the advertisements are scored based solely on the maximum offers per result associated with the advertisements, and
  wherein ad treatments are assigned to the advertisements in accordance with their scores.

9. The method of claim 8 wherein the ad treatments have result performances that monotonically decrease.

10. The method of claim 8 wherein each of the ad treatments has a selection rate, and wherein the selection rates of the ad treatments monotonically decrease.

11. The method of claim 8 wherein each of the ad treatments has a conversion rate, and wherein the conversion rates of the ad treatments monotonically decrease.

12. The method of claim 1 wherein the advertisements are scored using both the maximum offers per result associated with the advertisements and a result performance associated with the advertisement, and
  wherein the advertisements are assigned to ad spot positions in accordance with their scores.

13. The method of claim 12 wherein the ad spot positions have result performances that monotonically decrease.

14. The method of claim 12 wherein each of the ad spot positions has a selection rate, and wherein the selection rates of the ad spot positions monotonically decrease.

15. The method of claim 12 wherein each of the ad spot positions has a conversion rate, and wherein the conversion rates of the ad spot positions monotonically decrease.

16. The method of claim 1 wherein the advertisements are scored using both the maximum offers per result associated with the advertisements and a result performance associated with the advertisement, and
  wherein ad treatments are assigned to the advertisements in accordance with their scores.

17. The method of claim 16 wherein the ad treatments have result performances that monotonically decrease.

18. The method of claim 16 wherein each of the ad treatments has a selection rate, and wherein the selection rates of the ad treatments monotonically decrease.

19. The method of claim 16 wherein each of the ad treatments has a conversion rate, and wherein the conversion rates of the ad treatments monotonically decrease.

20. The method of claim 1 wherein the advertisements are scored based solely on the maximum offers per result associated with the advertisements, and
  wherein the advertisements are assigned to ad spot positions in accordance with their scores, wherein the ad spot positions have result performances that monotonically decrease, and wherein the act of computing an advertisement cost for at least one advertisement at an ad spot position i includes computing a weighted combination of offers of at least two advertisements at ad spot positions having worse results performances than that of ad spot position i, or of one such advertisement and a reserve price.

21. The method of claim 20 wherein weights used in the weighted combination are differences in the result performances of the corresponding ad spot positions.

22. The method of claim 1 wherein the advertisements are scored based solely on the maximum offers per result associated with the advertisements, and
   wherein the advertisements are assigned to ad spot positions in accordance with their scores,
   wherein the ad spot positions have result performances that monotonically decrease with increasing position index number, and
   wherein the act of computing an advertisement cost
   i) determines a first sum, over at least one ad spot position j with a worse performance than position i, of the product of (A) an offer associated with ad spot position j+1, and (B) a difference between a result performance of ad spot position j and ad spot position j+1,
   (ii) determines a second sum, over at least one ad spot position j with a worse performance than position i, of the a difference between a result performance of ad spot position j and ad spot position j+1, and
   iii) divides the first sum by the second sum.

23. The method of claim 1 wherein the advertisements are scored using both the maximum offers per result associated with the advertisements and a result performance associated with the advertisement, and
   wherein the advertisements are assigned to ad spot positions in accordance with their scores,
   wherein the ad spot positions have result performances that monotonically decrease, and
   wherein the act of computing an advertisement cost for at least one advertisement at an ad spot position i includes determining a weighted combination of scores of at least two advertisements at ad spot positions having worse results performances than that of ad spot position i, or of one such advertisement and a reserve price.

24. The method of claim 23 wherein weights used in the weighted combination are differences in the result performances of the corresponding ad spot positions.

25. The method of claim 1 wherein the advertisements are scored using both the maximum offers per result associated with the advertisements and a result performance associated with the advertisement, and
   wherein the advertisements are assigned to ad spot positions in accordance with their scores,
   wherein the ad spot positions have result performances that monotonically decrease with increasing position index number, and
   wherein the act of computing the advertisement cost
   i) determines a first sum, over at least one ad spot position j with a worse performance than position i, of the product of (A) a score associated with ad spot position j+1, and (B) a difference between a result performance of ad spot position j and ad spot position j+1,
   ii) determines a second sum, over at least one ad spot position j with a worse performance than position i, of the a difference between a result performance of ad spot position j and ad spot position j+1,
   iii) multiplies the second sum by the result performance of the ad to generate a product, and
   iv) divides the first sum by the product.

26. The method of claim 1 wherein the advertisements are scored based solely on the maximum offers per result associated with the advertisements, and
   wherein the advertisements are assigned to ad treatments in accordance with their scores,
   wherein the ad treatments have result performances that monotonically decrease, and
   wherein the act of computing an advertisement cost for at least one advertisement with an ad treatment i includes determining a weighted combination of offers of at least two advertisements with ad treatments having worse results performances than that of ad treatment i, or of one such advertisement and a reserve price.

27. The method of claim 26 wherein weights used in the weighted combination are differences in the result performances of the corresponding ad treatments.

28. The method of claim 1 wherein the advertisements are scored based solely on the maximum offers per result associated with the advertisements, and
   wherein the advertisements are assigned to ad treatments in accordance with their scores,
   wherein the ad treatments have result performances that monotonically decrease with increasing ad treatment index number, and
   wherein the act of computing an advertisement cost
   i) determines a first sum, over at least one ad treatment j with a worse performance than position i, of the product of (A) an offer associated with ad treatment j+1, and (B) a difference between a result performance of ad treatment j and ad treatment j+1,
   ii) determines a second sum, over at least one ad treatment j with a worse performance than ad treatment i, of the a difference between a result performance of ad treatment j and ad treatment j+1, and
   iii) divides the first sum by the second sum.

29. The method of claim 1 wherein the advertisements are using both the maximum offers per result associated with the advertisements and a result performance associated with the advertisement, and
   wherein the advertisements are assigned to ad treatments in accordance with their scores,
   wherein the ad treatments have result performances that monotonically decrease, and
   wherein the act of computing an advertisement cost for at least one advertisement with an ad treatment i includes determining a weighted combination of scores of at least two advertisements at ad treatments having worse results performances than that of ad treatment i, or of one such advertisement and a reserve price.

30. The method of claim 29 wherein weights used in the weighted combination are differences in the result performances of the corresponding ad treatments.

31. The method of claim 1 wherein the advertisements are scored using both the maximum offers per result associated with the advertisements and a result performance associated with the advertisement, and
   wherein the advertisements are assigned to ad treatments in accordance with their scores,
   wherein the ad treatments have result performances that monotonically decrease with increasing ad treatment index number, and
   wherein the act of computing an advertisement cost
   i) determines a first sum, over at least one ad treatment j with a worse performance than ad treatment i, of the product of (A) a score associated with ad treatment j+1, and (B) a difference between a result performance of ad treatment j and ad treatment j+1, ii) determines a second sum, over at least one ad treatment j with a worse performance than ad treatment i, of the a difference between a result performance of ad treatment j and ad treatment j+1, iii) multiplies the second sum by the result performance of the ad to generate a product, and iv) divides the first sum by the product.

32. Apparatus comprising:
a) an input for accepting advertisements, each of the advertisements having an associated maximum offer per result;
b) means for determining for at least one advertisement a marginal cost of increasing the maximum offer per result to move into a higher advertising position; and
c) means for determining, for the at least one advertisement, an advertisement cost as a function of information related to advertisements in lower advertising positions, in such a way that a marginal cost per result cannot exceed the maximum offer per result.

33. The apparatus of claim 32 wherein the marginal cost is defined as an amount of increase of the advertisement cost of all results divided by a number of additional results obtained by the increase of the maximum offer per result.

34. The apparatus of claim 32 wherein the result is selected from a group of results consisting of (A) an impression of the advertisement, (B) a selection of the advertisement, and (C) a conversion on the advertisement.

35. The apparatus of claim 32 wherein the advertisements are scored based solely on the maximum offers per result associated with the advertisements, and
wherein the advertisements are assigned to ad spot positions in accordance with their scores.

36. The apparatus of claim 35 wherein the ad spot positions have result performances that monotonically decrease.

37. The apparatus of claim 35 wherein each of the ad spot positions has a selection rate, and wherein the selection rates of the ad spot positions monotonically decrease.

38. The apparatus of claim 35 wherein each of the ad spot positions has a conversion rate, and wherein the conversion rates of the ad spot positions monotonically decrease.

39. The apparatus of claim 33 wherein the advertisements are scored based solely on the maximum offers per result associated with the advertisements, and
wherein ad treatments are assigned to the advertisements in accordance with their scores.

40. The apparatus of claim 39 wherein the ad treatments have result performances that monotonically decrease.

41. The apparatus of claim 39 wherein each of the ad treatments has a selection rate, and wherein the selection rates of the ad treatments monotonically decrease.

42. The apparatus of claim 39 wherein each of the ad treatments has a conversion rate, and wherein the conversion rates of the ad treatments monotonically decrease.

43. The apparatus of claim 32 wherein the advertisements are scored using both the maximum offers per result associated with the advertisements and a result performance associated with the advertisement, and
wherein the advertisements are assigned to ad spot positions in accordance with their scores.

44. The apparatus of claim 43 wherein the ad spot positions have result performances that monotonically decrease.

45. The apparatus of claim 43 wherein each of the ad spot positions has a selection rate, and wherein the selection rates of the ad spot positions monotonically decrease.

46. The apparatus of claim 43 wherein each of the ad spot positions has a conversion rate, and wherein the conversion rates of the ad spot positions monotonically decrease.

47. The apparatus of claim 32 wherein the advertisements are scored using both the maximum offers per result associated with the advertisements and a result performance associated with the advertisement, and
wherein ad treatments are assigned to the advertisements in accordance with their scores.

48. The apparatus of claim 47 wherein the ad treatments have result performances that monotonically decrease.

49. The apparatus of claim 47 wherein each of the ad treatments has a selection rate, and wherein the selection rates of the ad treatments monotonically decrease.

50. The apparatus of claim 47 wherein each of the ad treatments has a conversion rate, and wherein the conversion rates of the ad treatments monotonically decrease.

51. The apparatus of claim 32 wherein the advertisements are scored based solely on the maximum offers per result associated with the advertisements, and
wherein the advertisements are assigned to ad spot positions in accordance with their scores,
wherein the ad spot positions have result performances that monotonically decrease, and
wherein the means for determining a cost for at least one advertisement at an ad spot position i include means for determining a weighted combination of offers of at least two advertisements at ad spot positions having worse results performances than that of ad spot position i, or of one such advertisement and a reserve price.

52. The apparatus of claim 51 wherein weights used in the weighted combination are differences in the result performances of the corresponding ad spot positions.

53. The apparatus of claim 32 wherein the advertisements are scored using both the maximum offers per result associated with the advertisements and a result performance associated with the advertisement, and
wherein the advertisements are assigned to ad spot positions in accordance with their scores,
wherein the ad spot positions have result performances that monotonically decrease, and
wherein the means for determining a cost for at least one advertisement at an ad spot position i include means for determining a weighted combination of scores of at least two advertisements at ad spot positions having worse results performances than that of ad spot position i, or of one such advertisement and a reserve price.

54. The apparatus of claim 53 wherein weights used in the weighted combination are differences in the result performances of the corresponding ad spot positions.

55. The apparatus of claim 32 wherein the advertisements are scored based solely on the maximum offers per result associated with the advertisements, and
wherein the advertisements are assigned to ad treatments in accordance with their scores
wherein the ad treatments have result performances that monotonically decrease, and
wherein the means for determining a cost for at least one advertisement with an ad treatment i include means for determining a weighted combination of offers of at least two advertisements with ad treatments having worse results performances than that of ad treatment i, or of one such advertisement and a reserve price.

56. The apparatus of claim 55 wherein weights used in the weighted combination are differences in the result performances of the corresponding ad treatments.

57. The apparatus of claim 32 wherein the advertisements are using both the maximum offers per result associated with the advertisements and a result performance associated with the advertisement, and wherein the advertisements are assigned to ad treatments in accordance with their scores, wherein the ad treatments have result performances that monotonically decrease, and wherein the means for determining a cost for at least one advertisement with an ad treatment i include means for determining a weighted combination of scores of at least two advertisements at ad treatments having worse results performances than that of ad treatment i, or of one such advertisement and a reserve price.

58. The apparatus of claim 57 wherein weights used in the weighted combination are differences in the result performances of the corresponding ad treatments.

\* \* \* \* \*